(12) United States Patent
Vandertook et al.

(10) Patent No.: US 10,145,494 B2
(45) Date of Patent: Dec. 4, 2018

(54) AIR, ACOUSTIC AND/OR FIRE SEALING DEVICE

(71) Applicant: Hilti Aktiengesellschaft, Schaan (LI)

(72) Inventors: Joshua Vandertook, Tulsa, OK (US); Tamara Sarg, Dallas, TX (US); Lukas Schwaiger, The Colony, TX (US); Chad Stroike, Roanoke, TX (US)

(73) Assignee: Hilti Aktiengesellschaft, Schaan (LI)

( * ) Notice: Subject to any disclaimer, the term of this patent is extended or adjusted under 35 U.S.C. 154(b) by 175 days.

(21) Appl. No.: 15/355,148

(22) Filed: Nov. 18, 2016

(65) Prior Publication Data

US 2018/0142810 A1    May 24, 2018

(51) Int. Cl.
| | |
|---|---|
| *F16L 3/00* | (2006.01) |
| *F16L 5/02* | (2006.01) |
| *F16L 5/10* | (2006.01) |
| *F16L 5/04* | (2006.01) |
| *F16L 55/033* | (2006.01) |
| *H02G 3/04* | (2006.01) |
| *F16L 27/11* | (2006.01) |
| *H02G 3/22* | (2006.01) |

(52) U.S. Cl.
CPC ............. *F16L 5/025* (2013.01); *F16L 5/04* (2013.01); *F16L 5/10* (2013.01); *F16L 55/0336* (2013.01); *H02G 3/0412* (2013.01); *F16L 27/11* (2013.01); *H02G 3/22* (2013.01)

(58) Field of Classification Search
CPC .... F16L 5/04; F16L 5/025; F16L 5/10; H02G 3/22; H02G 3/0412
USPC ................ 138/121, 122, 106; 52/220.8, 232
See application file for complete search history.

(56) References Cited

U.S. PATENT DOCUMENTS

| | | |
|---|---|---|
| 6,862,852 B1 | 3/2005 | Beele |
| 7,082,730 B2 * | 8/2006 | Monden .................... F16L 5/04 138/161 |

(Continued)

FOREIGN PATENT DOCUMENTS

| | | |
|---|---|---|
| EP | 2 270 375 A1 | 1/2011 |
| WO | WO 81/02813 A1 | 10/1981 |
| WO | WO 2015/139114 A1 | 9/2015 |

OTHER PUBLICATIONS

International Bureau, International Search Report and Written Opinion in International Application No. PCT/EP2017/079263, dated Jan. 31, 2018.

(Continued)

*Primary Examiner* — Patrick F Brinson
(74) *Attorney, Agent, or Firm* — Leydig Voit & Mayer

(57) ABSTRACT

An air, acoustic and/or fire sealing device comprising an air, acoustic and/or fire sealing insert body comprising molded foam material, the body having a first end and a second end and a bulk continuous with the first end and the second end; wherein the body has an outer diameter, and the body is adapted to allow one or more pipes, fibers and/or cables to pass through the first and second ends and the bulk; and, a flexible hollow sleeve having an inner diameter, a first open end and a second open end, the ends being axially arranged; wherein the outer diameter of the air, acoustic and/or fire sealing insert body is greater than, equal to, or less than, the inner diameter of the flexible hollow sleeve; and, the air, acoustic and/or fire sealing insert body is arranged in the sleeve, is disclosed.

8 Claims, 12 Drawing Sheets

(56) References Cited

U.S. PATENT DOCUMENTS

| | | | |
|---|---|---|---|
| 7,465,888 B2* | 12/2008 | Fischer | E04G 15/061 |
| | | | 174/135 |
| 7,642,461 B2 | 1/2010 | Klein et al. | |
| 8,051,614 B1 | 11/2011 | Peck et al. | |
| 8,833,478 B2* | 9/2014 | Zernach | A62C 2/065 |
| | | | 169/48 |
| 2006/0000630 A1* | 1/2006 | Hemingway | A62C 3/16 |
| | | | 174/58 |
| 2008/0128998 A1* | 6/2008 | Klein | F16L 5/04 |
| | | | 277/604 |
| 2010/0269943 A1* | 10/2010 | Arai | E04F 17/04 |
| | | | 138/119 |
| 2010/0326678 A1 | 12/2010 | Monden et al. | |
| 2012/0012347 A1 | 1/2012 | Zernach et al. | |
| 2013/0161030 A1* | 6/2013 | Munzenberger | F16L 5/04 |
| | | | 169/48 |
| 2014/0367127 A1* | 12/2014 | Zernach | A62C 2/065 |
| | | | 169/48 |
| 2017/0030490 A1 | 2/2017 | Vandertook et al. | |

OTHER PUBLICATIONS

CP 653 BA—Firestop Speed Sleeve, Hilti Aktiengesellschaft, https://www.us.hilti.com/firestop-%26-fire-protection-systems/fire-stop-cast-in-%26-sleeve-devices/r3143561, printed Jul. 17, 2015.

* cited by examiner

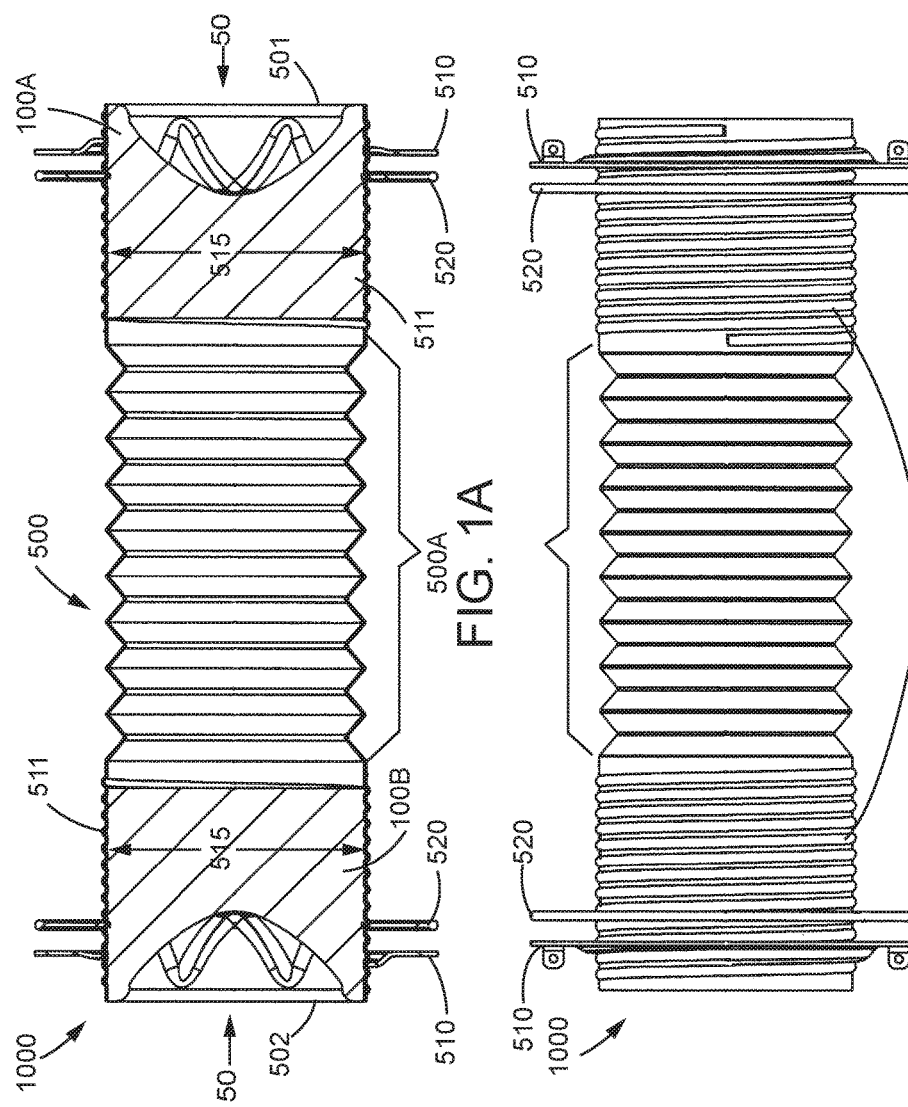

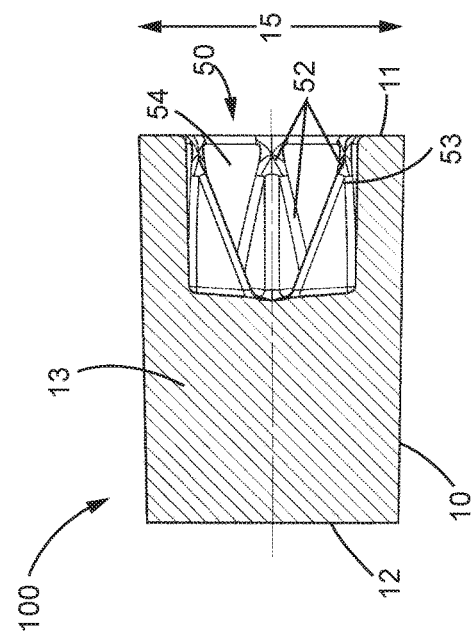
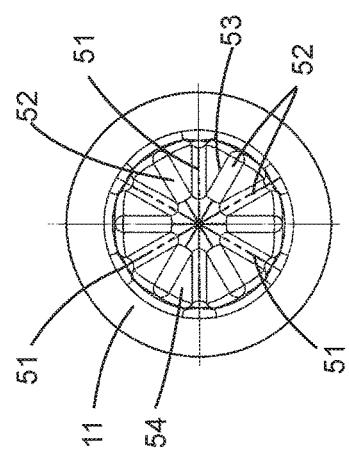
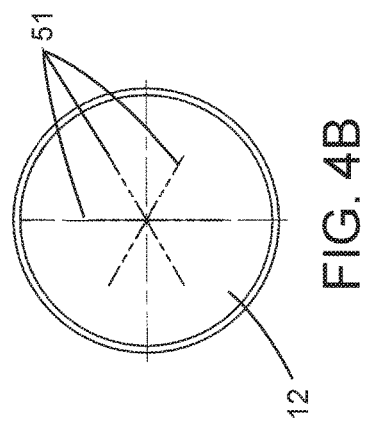
FIG. 4C
FIG. 4A
FIG. 4B

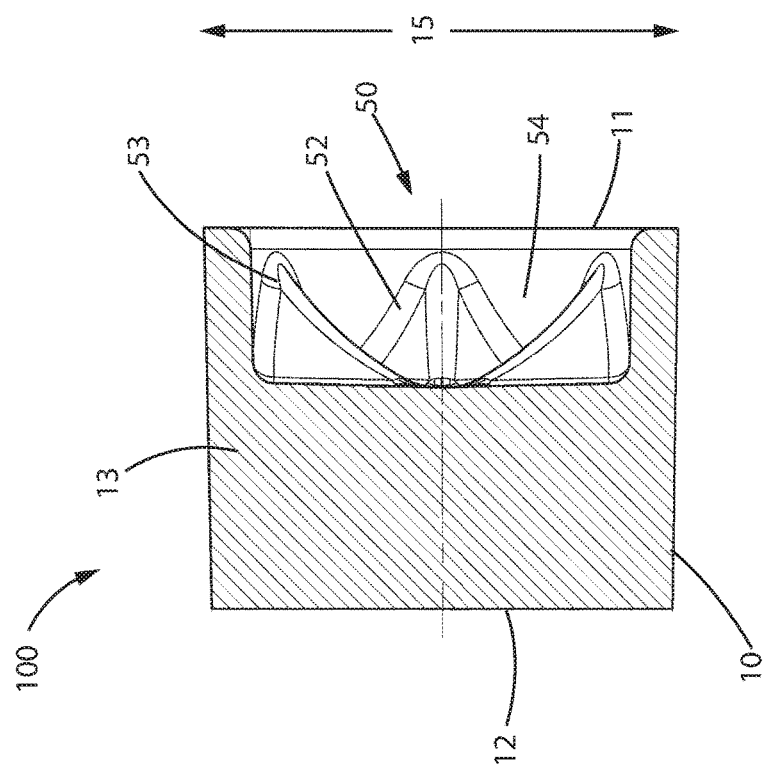

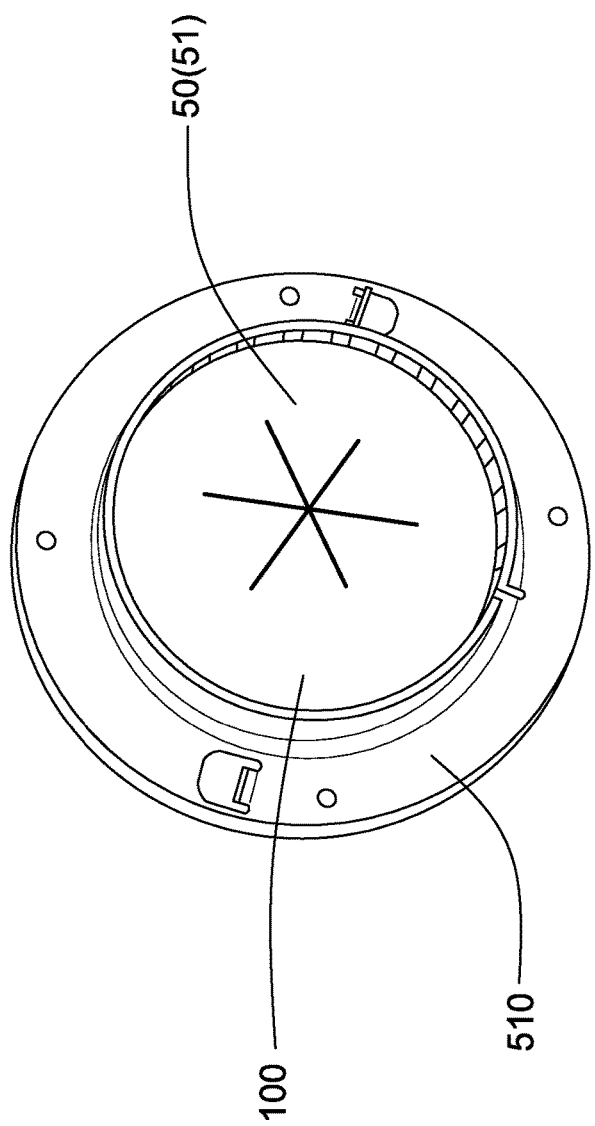

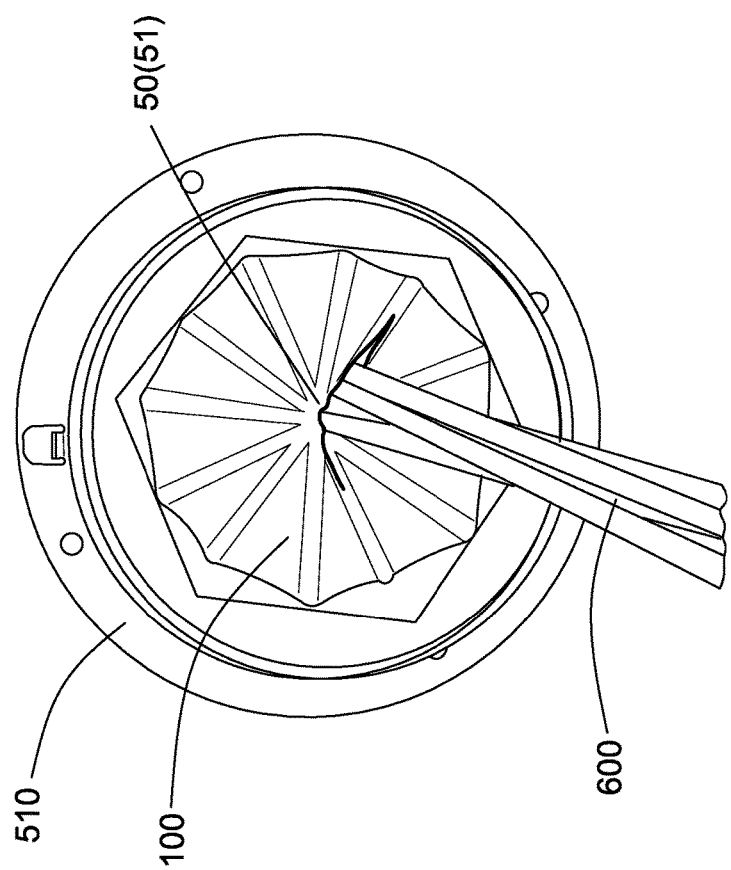

AIR, ACOUSTIC AND/OR FIRE SEALING DEVICE

BACKGROUND OF THE INVENTION

Air, acoustic, and/or fire sealing devices, typically located in openings in walls, floors, and/or ceilings, and having pipes, fibers, and/or cables passing therethrough, generally prevent the spread of smoke and/or other airborne media throughout an area such as facility, thereby limiting damage to the area, and providing occupants more time to safely evacuate the area. Alternatively, or additionally, the devices also prevent the passage of sound, as the sound could compromise privacy and/or frighten the occupants and therefore adversely impact the evacuation. If desired, the devices can be designed as fire stop devices, containing intumescent material that expands when exposed to extreme heat of the fire, sealing the openings to prevent the spread of flame and combustion through the openings.

However, there is a need for improvement of existing air, acoustic and/or fire sealing devices. The present invention provides for ameliorating at least some of the disadvantages of the prior art. These and other advantages of the present invention will be apparent from the description as set forth below.

BRIEF SUMMARY OF THE INVENTION

An embodiment of the invention provides an air, acoustic and/or fire sealing device comprising (a) an air, acoustic and/or fire sealing insert body comprising molded foam material, the body having a first end and a second end and a bulk continuous with the first end and the second end; wherein the body has an outer diameter, and the body is adapted to allow one or more pipes, fibers and/or cables to pass through the first and second ends and the bulk; and, (b) a flexible hollow sleeve comprising a flexible plastic, the flexible hollow sleeve having an inner diameter, a first open end and a second open end, the ends being axially arranged; wherein the outer diameter of the air, acoustic and/or fire sealing insert body is greater than, equal to, or less than, the inner diameter of the flexible hollow sleeve; and, the air, acoustic and/or fire sealing insert body is arranged in the sleeve.

In a preferred embodiment of the device, the flexible hollow sleeve comprises a bellows portion between the first open end and the second open end, the bellows portion allowing the sleeve to compress and/or expand in length, and, if necessary, adjust for off-centered penetrations.

In an embodiment of the device, the flexible hollow sleeve has an external surface wherein the external surface at the first open end and at the second open end comprises threads.

In some embodiments, the device further comprises a first flange and a second flange, wherein the first flange is slidably engaged with the threads on the external surface at the first open end of the sleeve, and the second flange is slidably engaged with the threads on the external surface at the second open end of the sleeve and/or the device further comprises a first gasket and a second gasket, wherein the first gasket is slidably engaged with the threads on the external surface at the first open end of the sleeve, and the second gasket is slidably engaged with the threads on the external surface at the second open end of the sleeve.

BRIEF DESCRIPTION OF THE SEVERAL VIEWS OF THE DRAWING(S)

FIG. 1A is a cross-sectional view, FIG. 1B is a side view, FIG. 1C is a perspective view, and FIG. 1D is an end view, of an embodiment of an air, acoustic and/or fire sealing device comprising (a) first and second air, acoustic and/or fire sealing insert bodies, each insert body comprising molded foam material, the body having a first end and a second end and a bulk continuous with the first end and the second end; wherein the body has an outer diameter, and the body is adapted to allow one or more pipes, fibers and/or cables to pass through the first and second ends and the bulk; and, (b) a flexible hollow sleeve having an inner diameter, a first open end and a second open end, the ends being axially arranged; wherein the outer diameter of each of the first and second air, acoustic and/or fire sealing insert bodies are greater than, equal to, or less than, the inner diameter of the flexible hollow sleeve; and, the first and second air, acoustic and/or fire sealing insert bodies are respectively arranged in the first and second open ends of the sleeve.

In the embodiment shown in FIG. 1A, the first and second insert bodies each have molded predetermined patterns at one end, wherein predetermined patterns of each of the air, acoustic and/or fire sealing inserts faces outwardly from the open ends of the sleeve.

FIG. 2A shows an external view of a portion of a flexible hollow sleeve comprising a bellows portion, the bellows portion allowing the sleeve to compress in length, FIG. 2B shows an external view of a portion of a flexible hollow sleeve comprising the bellows portion, the bellows portion allowing the sleeve to expand in length, and FIG. 2C shows an external view of a portion of the flexible hollow sleeve comprising the bellows portion, wherein the flexible sleeve allows the device to flex, so the device can be inserted in angled holes (accommodating off-center drilled holes).

FIG. 3 is a top view of an air, acoustic and/or fire sealing sleeve insert body for use in an embodiment of the device according to the present invention, the insert body comprising a predetermined pattern of a plurality of slits.

FIG. 4A is a top view, FIG. 4B is a bottom view, and FIG. 4C is a cross-sectional view, of an air, acoustic and/or fire sealing sleeve insert body for use in an embodiment of the device according to the present invention, the body comprising a predetermined pattern of a plurality of ribs, elevations, and slits, according to another embodiment of the present invention. FIG. 4D is a cross-sectional view of another air, acoustic and/or fire sealing sleeve insert body comprising a predetermined pattern of a plurality of ribs, elevations, and slits, for use in a device according to another embodiment of the present invention.

FIG. 5A shows an end view of an air, acoustic and/or fire sealing device including an insert body shown in FIG. 3.

DETAILED DESCRIPTION OF THE INVENTION

Figure 1C:
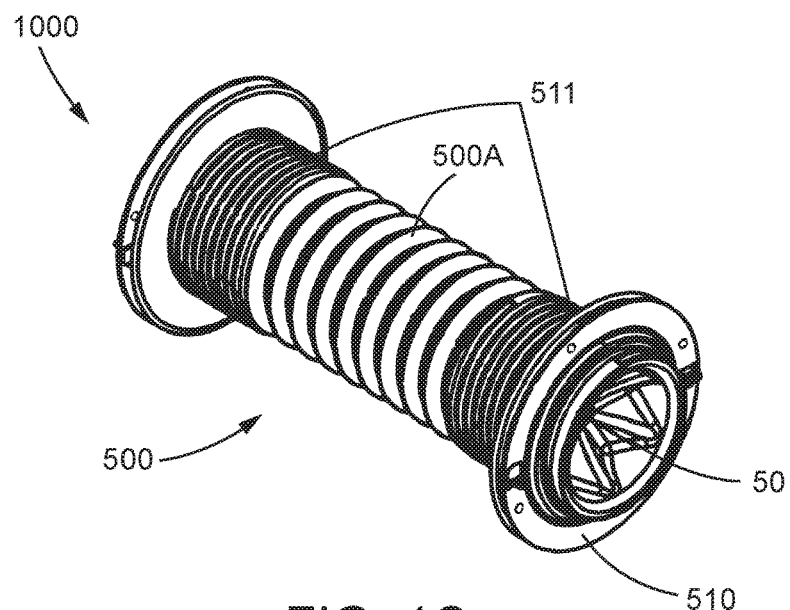
Figure 1D:
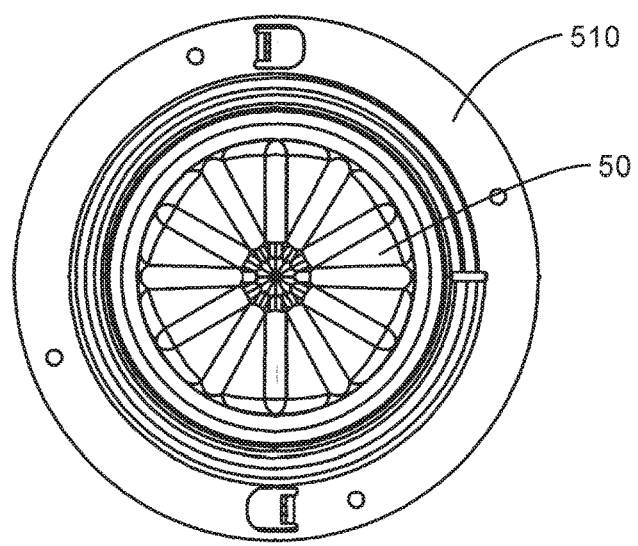
Figure 2A:
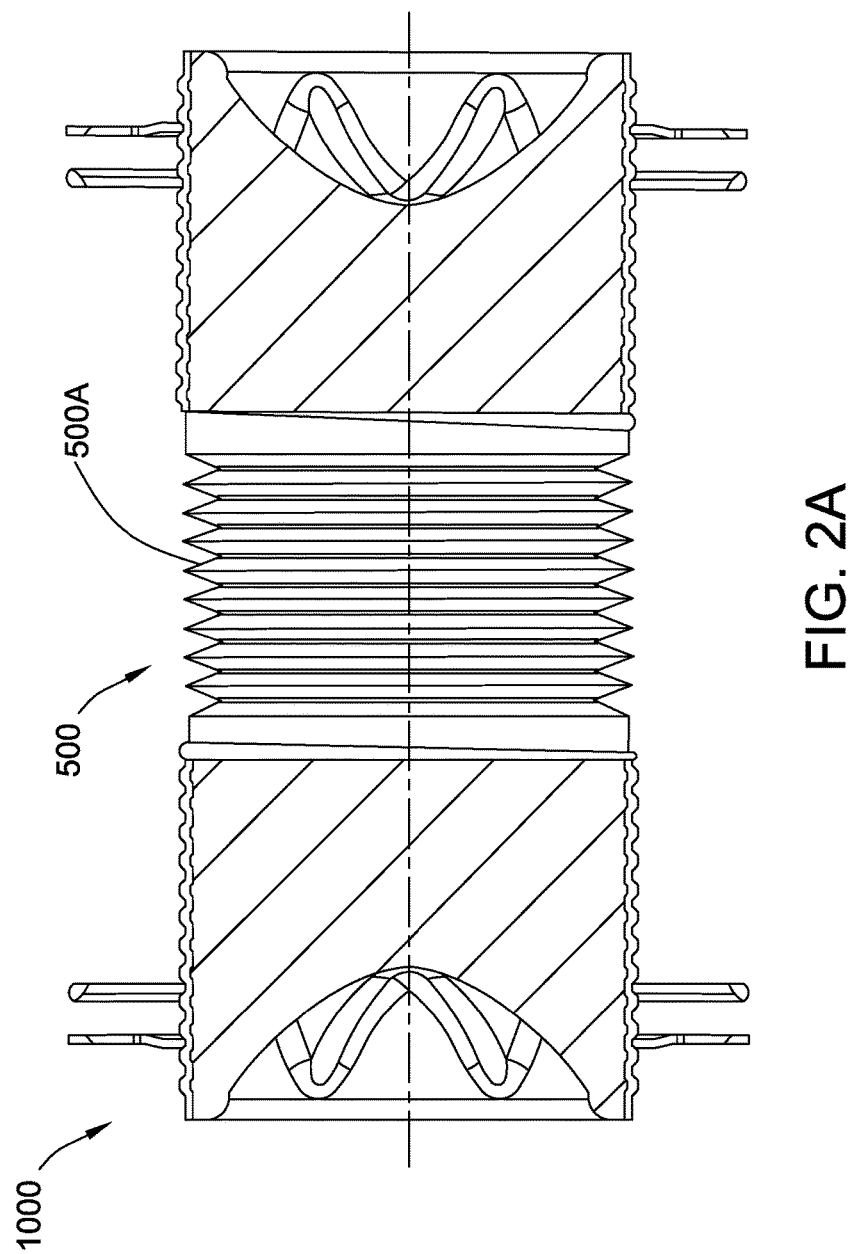
Figure 2B:
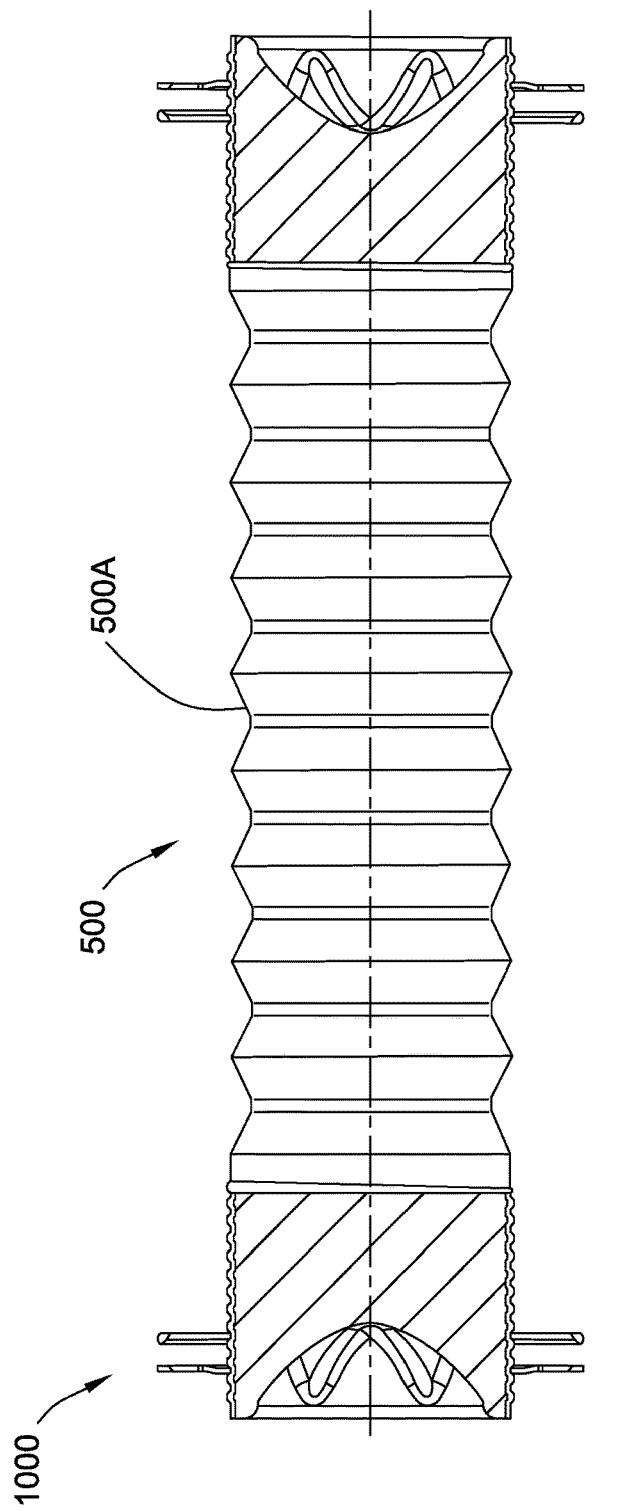
Figure 2C:
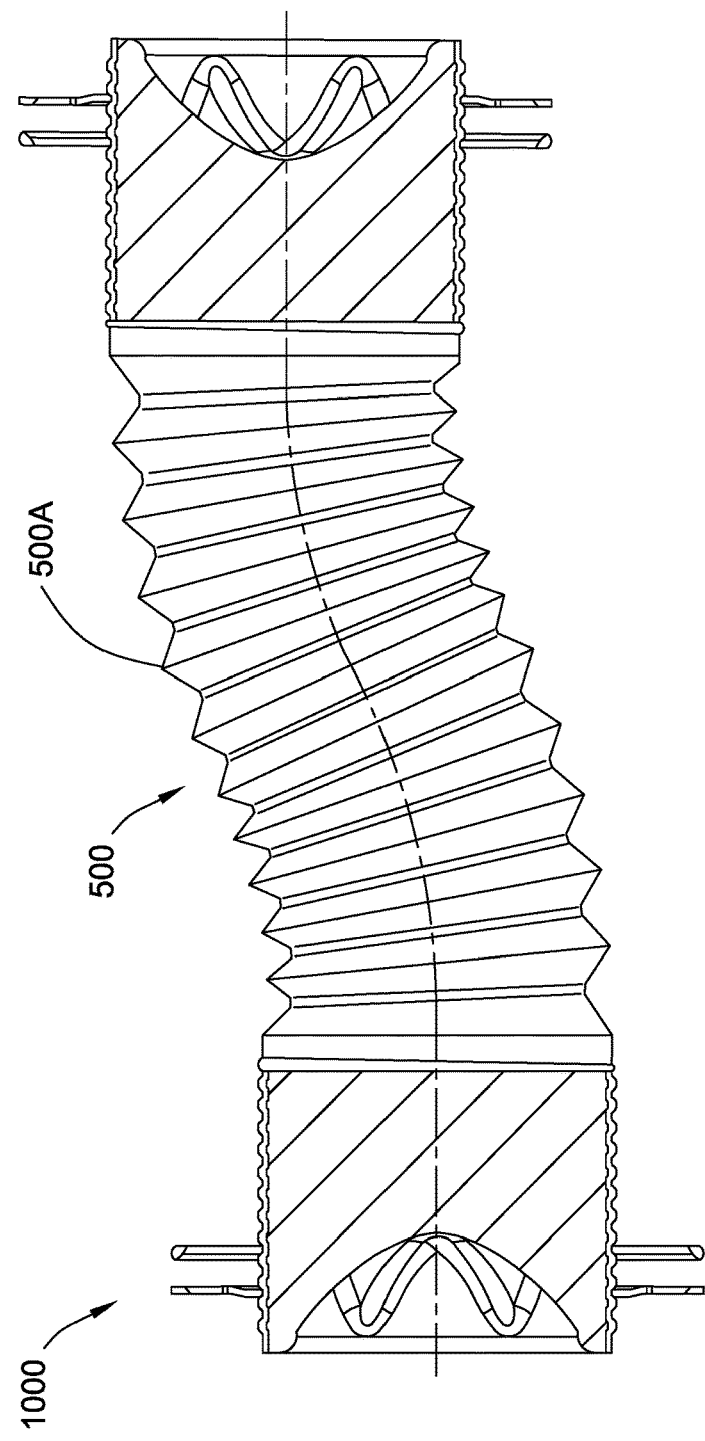

In accordance with an embodiment of the present invention, an air, acoustic and/or fire sealing device comprises (a) an air, acoustic and/or fire sealing insert body comprising molded foam material, the body having a first end and a second end and a bulk continuous with the first end and the second end; wherein the body has an outer diameter, and the body is adapted to allow one or more pipes, fibers and/or cables to pass through the first and second ends and the bulk;

and, (b) a flexible hollow sleeve comprising a flexible plastic, the flexible hollow sleeve having an inner diameter, a first open end and a second open end, the ends being axially arranged; wherein the outer diameter of the air, acoustic and/or fire sealing insert body is greater than, equal to, or less than, the inner diameter of the flexible hollow sleeve; and, the air, acoustic and/or fire sealing insert body is arranged in the sleeve. Preferably, the device includes first and second air, acoustic and/or fire sealing insert bodies arranged in the sleeve.

In a preferred embodiment of the device, the flexible hollow sleeve comprises a bellows portion between the first open end and the second open end, the bellows portion allowing the sleeve to compress and expand in length.

In an embodiment of the device, the flexible hollow sleeve has an external surface, and the external surface at the first open end and at the second open end comprises threads.

In some embodiments, the device further comprises a first flange and a second flange, wherein the first flange is slidably engaged with the threads on the external surface at the first open end of the sleeve, and the second flange is slidably engaged with the threads on the external surface at the second open end of the sleeve and/or the device further comprises a first gasket and a second gasket, wherein the first gasket is slidably engaged with the threads on the external surface at the first open end of the sleeve, and the second gasket is slidably engaged with the threads on the external surface at the second open end of the sleeve.

In an embodiment, the device further comprises (1) a first flange and a second flange, wherein the first flange is slidably engaged with the threads on the external surface at the first open end of the sleeve, and the second flange is slidably engaged with the threads on the external surface at the second open end of the sleeve, and/or (2) a first gasket and a second gasket, wherein the first gasket is slidably engaged with the threads on the external surface at the first open end of the sleeve, and the second gasket is slidably engaged with the threads on the external surface at the second open end of the sleeve. Preferably, the first flange is disposed closer to the first open end of the sleeve than the first gasket, and the second flange is disposed closer to the second open end of the sleeve than the second gasket.

In some embodiments of the device, an insert body comprises a generally cylindrical body, wherein the bulk has a generally cylindrical shape, and the flexible hollow sleeve comprises a generally cylindrical shape.

In an embodiment of the device, at least the first end of an insert body comprises a molded predetermined pattern. For example, the molded predetermined pattern can comprise a plurality of ribs and elevations. Alternatively, or additionally, in an embodiment, the molded predetermined pattern comprises a plurality of slits passing through the body in a direction longitudinal to the body.

In one preferred embodiment of the device, the molded foam material of the insert body comprises polyurethane. In some embodiments, the molded foam material comprises an intumescent material.

The air, acoustic and/or fire sealing insert body can have any desired shape, in one embodiment, comprising a generally cylindrical body, wherein the bulk has a generally cylindrical shape.

Similarly, the flexible hollow sleeve can have any desired shape (preferably generally corresponding to the shape of the sealing insert body), in one embodiment, comprising a generally cylindrical shape.

In a preferred embodiment, the flexible hollow sleeve comprises a bellows portion along at least a portion (e.g., at least the central portion) of the length of the sleeve. Advantageously, the bellows portion allows the sleeve to be reduced and/or expanded, in length, and this adjustment allows the device to be used with walls of different thicknesses.

Typically, the (or first) air, acoustic and/or fire sealing insert body is arranged in the first open end of the flexible sleeve. In one embodiment of the air, acoustic and/or fire sealing device, the first insert body has a molded predetermined pattern, and the pattern faces outwardly from the first open end of the sleeve. In another embodiment, the molded predetermined pattern of the first air, acoustic and/or fire sealing insert faces inwardly from the first open end of the sleeve.

In a preferred embodiment of the air, acoustic and/or fire sealing device, it further comprises an additional (second) air, acoustic and/or fire sealing insert body, arranged in the sleeve, typically, wherein the second air, acoustic and/or fire sealing insert body is arranged in the second open end of the sleeve. In one embodiment, the second insert body has a molded predetermined pattern, and the pattern faces outwardly from the second open end of the sleeve, an another embodiment, the molded predetermined pattern of the second air, acoustic and/or fire sealing insert faces inwardly from the second open end of the sleeve.

Advantageously, one or more of any of the following are provided: (a) the device can be easily adjusted for use with walls of different thicknesses; (b) by avoiding the use of a metal sleeve, sound transmission can be reduced; (c) the use of a central bellows portion decouples the ends of the device with respect to sound transmission, further reducing sound transmission; (d) the use of a flexible sleeve allows the device to flex, so the device can be inserted in angled holes (accommodating off-center drilled holes); (e) the foam material allows for any diameter pipe, cable and/or fiber and/or multiple pipe, cable and/or fiber bundle to be inserted and sealed as the foam expands or contracts around the cable(s), fiber(s), and/or pipe(s); (f) it is easy to penetrate the insert from either end; (g) high cable load is possible; (h) efficient air, acoustic and/or fire and tightness/blocking, as no visible openings around pipe(s), cable(s) and/or fiber(s); (i) long pipe(s), cable(s) and/or fiber(s) can be passed through without impacting the foam surface; (j) one step application, no opening is necessary, as the pipe(s), cable(s) and/or fiber(s) can easily slide through the foam (though, if desired, the inserts can have one or more slits); and (k) cost-effective production and assembly. If desired, e.g., wherein the insert comprises an intumescent material, the inserts and devices can be used in firestop applications. Alternatively, or additionally, inserts and/or devices can be retrofit into existing devices and applications.

Each of the components of the invention will now be described in more detail below, wherein like components have like reference numbers.

FIGS. 1A-1D show embodiments of air, acoustic and/or fire sealing devices 1000, each comprising a hollow flexible sleeve 500 with a first open end 501, and a second open end 502 (the sleeve having an inner diameter 515), with a bellows portion 500A between the first and second open ends, wherein the devices include first and second air, acoustic and/or fire sealing insert bodies (100A, 100B), arranged in the open ends of the sleeve. In the illustrated embodiments, the insert bodies each have an optional molded predetermined pattern, and the pattern faces outwardly from the open ends of the sleeve. However, in another embodiment, the device has a single insert body, arranged in a location other than an open end. Alternatively, or additionally, if the insert has a molded predetermined pattern, the molded predetermined pattern of the insert(s) can face inwardly from the open end(s) of the sleeve.

The flexible hollow sleeve 500 can comprise any suitable plastic material, for example, blow molded plastic. For some fire sealing applications, an embodiment of the device can include metal threaded sections on each end, and a rubber/plastic bellows section that couples the sections together. The sleeve is preferably an integral sleeve, e.g., as illustrated. Alternatively, however, the sleeve can comprise a multi-piece and/or slit sleeve, e.g., wherein the walls of the sleeve are joined together before installation.

A portion of the sleeve between the first and second ends comprises a flexible bellows portion 500A, which can allow the sleeve to compress and/or expand in length (allowing the device to be used with walls of different thicknesses), and, if desired, allow the device to flex. The use of a central bellows portion can decouple the ends of the device with respect to sound transmission, further reducing sound transmission. In some embodiments, the bellows comprises plastic and/or rubber.

The illustrated embodiments of the devices also include flanges 510 (also shown in FIGS. 5A, 5B, 6A, and 6B) engageable with the sleeve, e.g., for ease of installing or embedding the device into a constructional component (e.g., a concrete wall). If desired, and as shown, the flange(s) can include openings (and brackets with openings) for passing fastening elements such as nails, screws and/or bolts therethrough. If desired, and as shown in FIGS. 1A-1C, the sleeve 500 can include threads 511 so that the flanges can be slidably engaged with the sleeves (e.g., for ease in adjustment so that the device can be used with constructional components of different thicknesses).

However, flanges are not required, for example, the device can be sealed and/or secured to a structural component via one or more of any of the following sealants, insulation (including foam insulation), putty, and or tape (such as sealing tape). If desired, a flange can be used in combination with one or more of these sealing and/or securing components.

In some embodiments, the device also includes gaskets 520, engageable with the sleeve. The use of an air, acoustic and/or fire-tight gasket can be desirable in providing extra sealing by sealing the wall penetration behind the flange. Similar to the arrangement for the flanges, if desired, and as shown in FIGS. 1A-1C, the sleeve 500 can include threads 511 so that the gaskets and/or flanges can be engaged (slidably and/or threadably engaged) with the sleeves (e.g., for ease in adjustment so that the device can be used with constructional components of different thicknesses).

In some embodiments, the device includes an edge bushing. The use of an edge bushing can be desirable in providing extra protection to the pipe(s), cable(s) and/or fiber(s) when pulled through the insert body/device.

FIGS. 3 and 4A-4D show illustrative air, acoustic and/or fire sealing sleeve inserts 100 suitable for use in embodiments of the device, the inserts comprising a body 10 comprising molded foam material, the body having a first end 11 and a second end 12 and a bulk 13 continuous with the first end and the second end; wherein at least the first end comprises a molded predetermined pattern 50. As shown in FIGS. 4C and 4D, the inserts have an outer diameter 15. The inserts comprise air-sealing (e.g., smoke-sealing) material, preferably also providing for sound-sealing, and in some embodiments, fire-sealing. As used herein "sealing" air, sound, and/or fire includes "blocking," air, sound, and/or fire, and "air" includes airflow, and airborne particles (including, for example, smoke, airborne pathogens, and odors).

Figure 3:
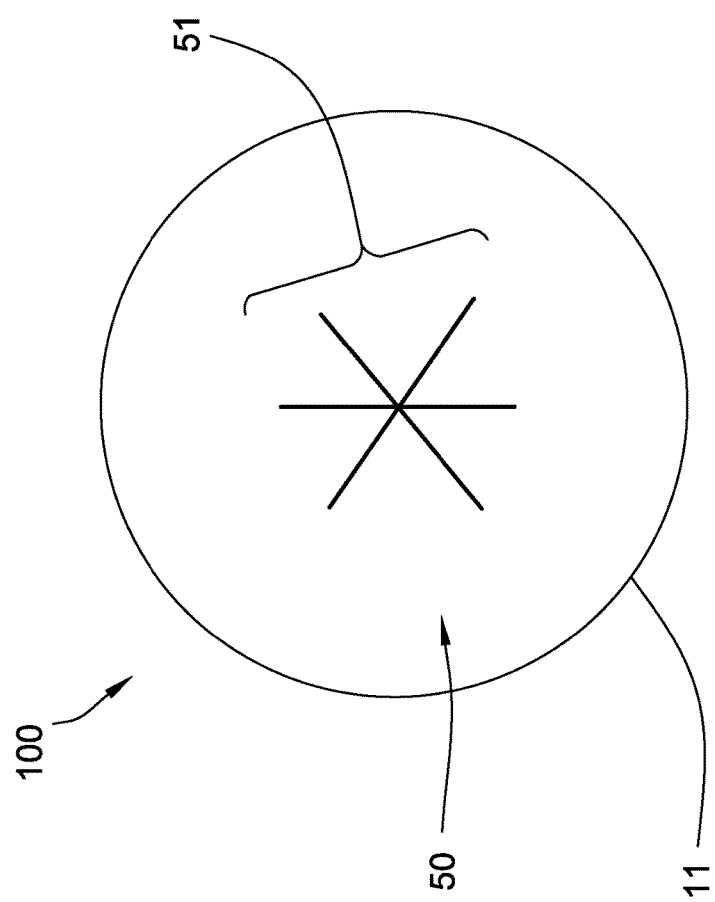

In the embodiment shown in FIG. 3, the predetermined pattern 50 includes a plurality of slits 51. While not shown in the top view of FIG. 3, the slits pass through the body in a direction longitudinal to the body.

In the embodiment shown in FIGS. 4A-4D, the predetermined pattern 50 includes a plurality of ribs 52 and elevations 53 (and valleys 54), as well as a plurality of slits 51 (wherein the slits pass through the body in a direction longitudinal to the body).

The number of ribs and elevations, and the depth of the elevations, can be selected to ensure sufficient closure of the foam material around the pipe(s), cable(s) and/or fiber(s), e.g., to reduce or avoid gaps. Additionally, or alternatively, the length of the insert can be selected to provide, for example, desired air tightness and/or desired acoustic properties.

While the embodiments illustrated in FIGS. 3 and 4A-4D show the insert 100 comprising a generally cylindrical body, wherein the bulk has a generally cylindrical shape, other shapes are possible, e.g., wherein neither the sleeve, nor the insert, has a cylindrical form.

Figure 5B:
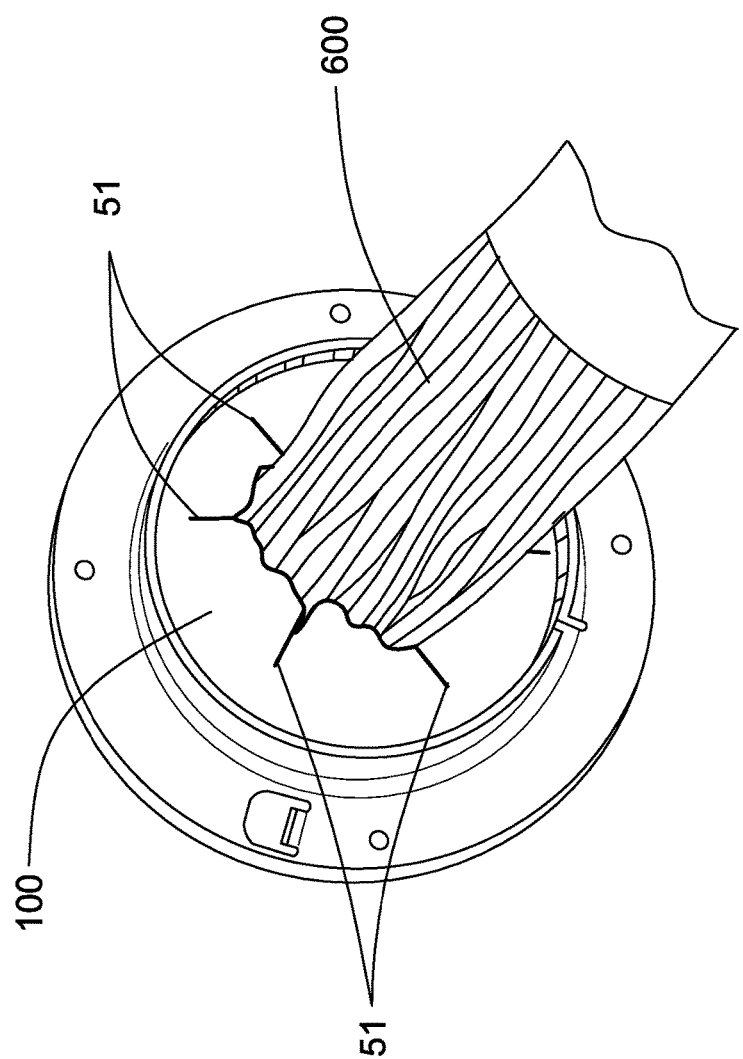
FIG. 5B shows pipes, cables and/or fibers passing through the air, acoustic and/or fire sealing insert.
Figure 6A:
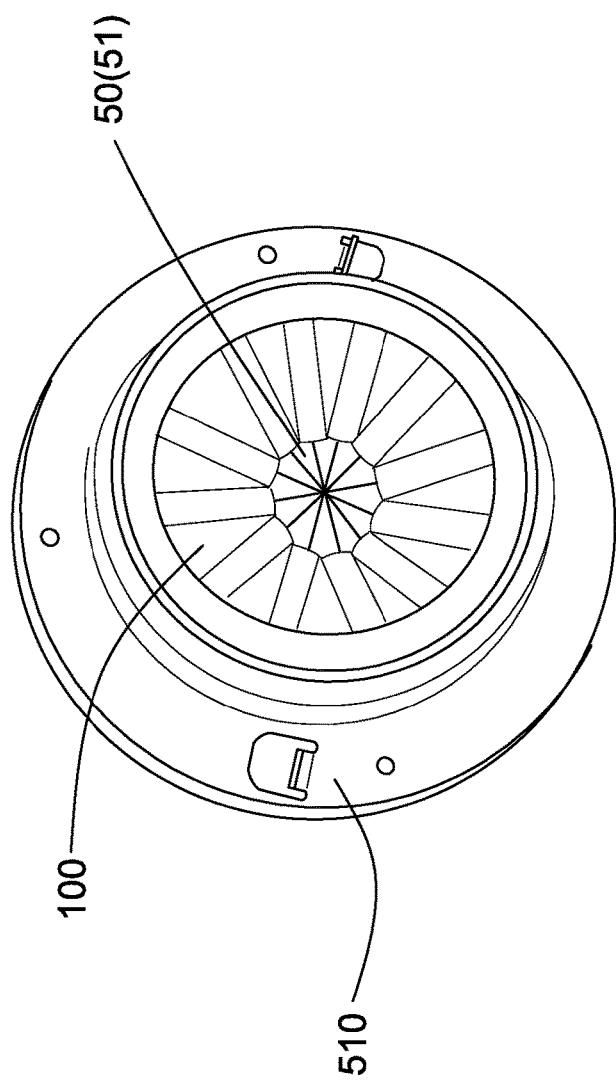
FIG. 6A shows an end view of an air, acoustic and/or fire sealing device including an insert body shown in FIGS. 1A, 1D, and 4C, 4D, and FIG. 6B show pipes, cables and/or fibers passing through the air, acoustic and/or fire sealing insert.

As shown in FIGS. 5A and 5B, as well as 6A and 6B, the foam material allows for any diameter multiple pipe, cable and/or fiber bundle 600 (and/or individual pipe, cable and/or fiber) or to be inserted and sealed as the foam expands or contracts around the pipe(s), cable(s) and/or fiber(s).

As noted above, the embodiments illustrated in FIGS. 3 and 4A-4D show inserts comprising generally cylindrical bodies wherein the bulks each have a generally cylindrical shape, and FIG. 1A shows a flexible sleeve having a generally cylindrical shape.

A variety of foam materials are suitable. The foam material can be an open-cell foam material with very low air permeability, an almost closed-cell foam material with extreme low air permeability, and a closed-cell foam material; the foam material may also be impregnated to enhance the sealing properties; to provide sufficient tightness against air, acoustic and/or fire at least the outer surface of the foam insert should have closed pores.

Suitable materials include, for example, cellular rubber (e.g., closed-cell cellular rubber), foam materials such as polyethylene and polyurethane foam or natural or synthetic rubber, such as styrene butadiene rubber (SBR), ethylene propylene diene monomer rubber (EPDM), or polychloroprene rubber.

Other materials and processes suitable for producing the air, acoustic and/or fire sealing insert are disclosed in, for example, U.S. Patent Application Publication Number U.S. 2013/0161030. For example, the production of the molded foam body can be by mold foaming, such as reaction injection molding (RIM), according to DE 3917518, e.g., using FOMOX® fire prevention foam or the material HILTI CP 65GN forming the insulation layer. Material which may be used for the purposes according to the invention are known from EP 0061024 A1, EP 0051106 A1, EP 0043952 A1, EP 0158165 A1, EP 0116846 A1, and U.S. Pat. No. 3,396,129 A, as well as EP 1347549 A1. Preferably, the molded body comprises a polyurethane foam capable of intumescence, such as known from EP 0061024 A1, DE 3025309 A1, DE 3041731 A1, DE 3302416 A, and DE 3411 327 A1.

In an embodiment, the insert body is produced to have a slightly greater outer diameter than the inner diameter of the sleeve at the sleeve location where the insert body is arranged, such that the insert remains in place while the pipe(s)/fiber(s)/cable(s) are being passed therethrough. However, in other embodiments, the insert can have an outer diameter equal to, or less than, the inner diameter of the sleeve. For example, the sleeve can provide for air and/or acoustic sealing and have an outer diameter equal to, or less than, the inner diameter of the sleeve, and a separate intumescent material can be included (e.g., as a strip), such that the foam material is compressed with the sleeve and insert are inserted into the sleeve. If desired, the insert body or bodies can be secured (or further secured) in the sleeve via an adhesive, e.g., hot melt glue or other high bond adhesive.

The insert body can be produced as is known in the art, e.g., reaction injection molded into a form or template, and molded.

The molded body can comprise a foaming binder, which at least comprises an ash-forming and perhaps intumescent material mixture. Here, this binder serves as a compound-forming carrier for the ash-forming and perhaps intumescent material mixture. Preferably the material mixture is distributed homogeneously in the binder. The compound-forming carrier is preferably selected from a group comprising polyurethane, phenol-resins, polystyrene, polyolefin, such as polyethylene and/or polybutylene, melamine resin, melamine resin-foam, synthetic or natural rubber, cellulose, elastomers, and mixtures therefrom, with polyurethane being preferred.

The ash-forming and in some embodiments intumescent material mixture may comprise the fire prevention additives commonly used and known to one trained in the art, which in case of fire, thus under the impact of heat, foam and thus form a froth hindering the fire from spreading, such as an intumescent material based on an acid former, a compound yielding carbon, and a gas former. Preferably the intumescent material comprises a salt or an ester of an inorganic, non-volatile acid as the acid former, selected from sulfuric acid, phosphoric acid, and boric acid, a polyhydroxy-compound as the compound yielding carbon, and/or a thermoplastic or duroplastic polymer resin binder, and as a gas former a chloroparaffin, melamine, a melamine compound, particularly melamine cyanurate, melamine phosphate, melamine polyphosphate, tri(hydroxyl ethyl)-cyanurate, cyanamide, dicyanamide, dicyanadiamide, biguanidine, and/or a guanidine salt, particularly guanidine phosphate or guanidine sulfate.

The compound-forming carrier may further comprise an inorganic compound as an ablative additive, which comprises water, e.g., water of crystallization, tightly bonded and not evaporating at temperatures up to 100° C., however releases it in case of fire at 120° C. and thus is able to cool temperature-guiding parts, preferably an inorganic hydroxide or hydrate, particularly aluminum hydroxide, aluminum oxide hydrate, or partially hydrated aluminum hydroxides releasing water preferably at fire temperature and/or when subjected to flames. However, other inorganic hydroxides or hydrates releasing water when subjected to flames may also be used, such as described in EP 0 274 068 A2.

Such compounds, which may be used as mixtures of material in the fire prevention insert according to one or more embodiments of the invention, are known to one trained in the art and disclosed, for example, in the following publications, which are hereby included by of reference: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1, and DE 196 53 503 A1.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An air, acoustic and/or fire sealing device comprising:
   (a) an air, acoustic and/or fire sealing insert body comprising molded foam material, the body having a first end and a second end and a bulk continuous with the first end and the second end; wherein the body has an outer diameter, and the body is configured to allow one or more pipes, fibers and/or cables to pass through the first and second ends and the bulk; and,
   (b) a flexible hollow sleeve comprising a flexible plastic, the flexible hollow sleeve having an inner diameter, a first open end and a second open end, the ends being axially arranged, wherein the flexible hollow sleeve has an external surface, and the external surface at the first open end and at the second open end comprises threads; wherein the outer diameter of the air, acoustic and/or fire sealing insert body is greater than, equal to, or less than, the inner diameter of the flexible hollow sleeve; and, the air, acoustic and/or fire sealing insert body is arranged in the flexible hollow sleeve, wherein the device further comprises a first gasket and a second gasket, wherein the first gasket is slidably engaged with the threads on the external surface at the first open end of the flexible hollow sleeve, and the second gasket is slidably engaged with the threads on the external surface at the second open end of the flexible hollow sleeve.

2. The device of claim 1, wherein the flexible hollow sleeve comprises a bellows portion between the first open end and the second open end, the bellows portion allowing the sleeve to compress and/or expand in length.

3. The device of claim 1, further comprising a first flange and a second flange, wherein the first flange is slidably engaged with the threads on the external surface at the first open end of the sleeve, and the second flange is slidably engaged with the threads on the external surface at the second open end of the sleeve.

4. The device of claim 3, wherein the first flange is disposed closer to the first open end of the sleeve than the first gasket, and the second flange is disposed closer to the second open end of the sleeve than the second gasket.

5. The device of claim 1, wherein the insert body comprises a generally cylindrical body, wherein the bulk has a generally cylindrical shape, and the flexible hollow sleeve comprises a generally cylindrical shape.

6. The device of claim 2, wherein the insert body comprises a generally cylindrical body, wherein the bulk has a generally cylindrical shape, and the flexible hollow sleeve comprises a generally cylindrical shape.

7. The device of claim 3, wherein the insert body comprises a generally cylindrical body, wherein the bulk has a generally cylindrical shape, and the flexible hollow sleeve comprises a generally cylindrical shape.

8. The device of claim 4, wherein the insert body comprises a generally cylindrical body, wherein the bulk has a generally cylindrical shape, and the flexible hollow sleeve comprises a generally cylindrical shape.

* * * * *